(12) United States Patent
Gloor et al.

(10) Patent No.: US 7,136,823 B2
(45) Date of Patent: Nov. 14, 2006

(54) BUSINESS METHOD FOR QUALITY ASSURANCE OF SERVICES

(75) Inventors: Russell Frederick Gloor, Lake Huntington, NY (US); Kathleen Moore Kurlanski, Falmouth, ME (US); Myla Steelman Miller, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 10/935,788

(22) Filed: Sep. 8, 2004

(65) Prior Publication Data

US 2005/0033620 A1    Feb. 10, 2005

Related U.S. Application Data

(62) Division of application No. 09/439,310, filed on Nov. 12, 1999, now Pat. No. 6,859,781.

(51) Int. Cl.
*G06F 9/44* (2006.01)
(52) U.S. Cl. ............... 705/7; 705/1; 705/8; 705/9; 705/10; 705/26; 705/11; 705/2; 358/1; 379/112; 379/230; 235/238; 235/379; 707/104.1
(58) Field of Classification Search ............ 705/1, 705/2, 7–10, 26; 358/1; 379/112; 235/380
See application file for complete search history.

(56) References Cited

U.S. PATENT DOCUMENTS

| 5,208,765 | A | * | 5/1993 | Turnbull ................ 702/84 |
| 5,307,262 | A | | 4/1994 | Ertel .................. 364/413.01 |
| 5,452,218 | A | | 9/1995 | Tucker et al. ............ 364/468 |
| 5,537,483 | A | | 7/1996 | Stapleton et al. ......... 382/309 |
| 5,644,493 | A | | 7/1997 | Motal et al. ............ 364/468.02 |
| 5,717,598 | A | | 2/1998 | Miyakawa et al. .... 364/468.09 |
| 5,737,581 | A | | 4/1998 | Keane .................... 395/500 |
| 6,161,113 | A | * | 12/2000 | Mora et al. ................ 705/505 |

OTHER PUBLICATIONS

Eisener, Howard. "Essentials of Project Management and Systems Engineering Management." 1977, John Wiley and Sons; New York. pp. 46-53, 58-60, 147-176.*

* cited by examiner

*Primary Examiner*—James A Reagan
(74) *Attorney, Agent, or Firm*—Schmeiser, Olsen & Watts; John R. Pivnichny

(57) ABSTRACT

The quality of information technology services provided by an organization to a customer is assured. Assurance reviews of a first solution are performed and a second solution is defined to correct deficiencies. A third assurance review is performed. Customer commitment to the second solution is obtained. A readiness review, a project management review, and a deliverable readiness review are performed assuring customer need satisfaction.

20 Claims, 1 Drawing Sheet

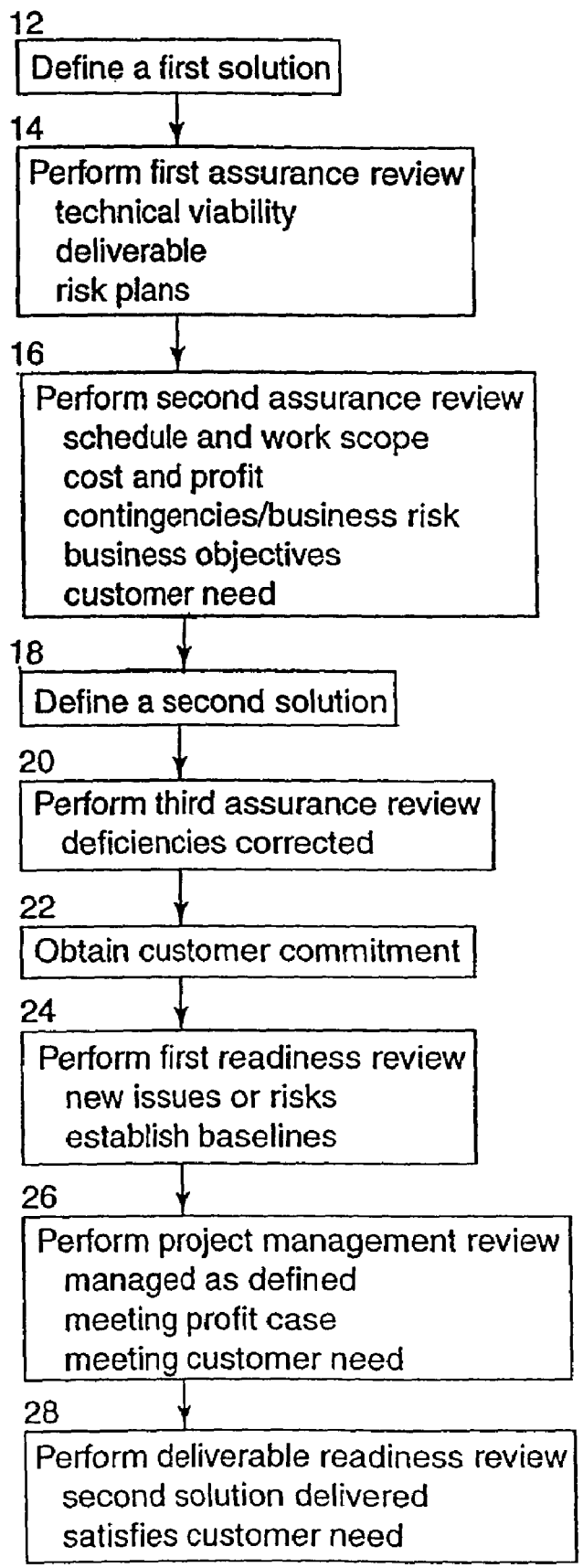

BUSINESS METHOD FOR QUALITY ASSURANCE OF SERVICES

This application is a divisional of Ser. No. 09/439,310; filed on Nov. 12, 1999 now U.S. Pat. No. 6,859,781.

TECHNICAL FIELD

The invention relates to business methods for assuring quality services and particularly to delivering information technology services which have a high quality assurance.

BACKGROUND OF THE INVENTION

Providing information technology services has become an important part of business activity. Businesses recognize that having high quality information technology services are essential to operating their businesses in a competitive fashion. Various service providing companies compete with each other in formulating bidding for and delivering these services to their own and other companies. It is therefore also essential that these formulating, bidding for, and delivering aspects of the information technology service be carried out with high quality if a service providing company is to be successful in this competitive area.

While quality techniques have been applied in the operation of various businesses, including primarily hardware manufacture, little attention has been directed to quality processes in the service business area. Keane, in U.S. Pat. No. 5,737,581 describes a product flow monitoring system including quality assurance measures. Turnbull, in U.S. Pat. No. 5,208,765 describes a method and structure of a product development monitoring system in which the process is divided into stages including quality assurance. Stapleton, in U.S. Pat. No. 5,537,483 describes a quality assurance feature of an image processing system. Ertel in U.S. Pat. No. 5,307,262 describes a data quality review method and system in the health care environment. Tucker et al. in U.S. Pat. No. 5,432,218 describe determining quality levels for fabrication and assembly designs of a manufactured product. Motai et al. in U.S. Pat. No. 5,644,493 describe forming a quality control instruction table on the basis of a manufacturing drawing of the product. Miyakawa et al. in U.S. Pat. No. 5,717,598 describe a manufacturability evaluation method to be employed while designing an article.

Unfortunately, none of the above quality systems apply to assuring the quality of solutions in the service industry or more particularly in the information technology service industry.

Information technology services include but are not limited to, selecting and providing workstation hardware, software operating systems and applications, server hardware and software, network and communication hardware and software, installation and maintenance of the above hardware and software, help desk operation, user training and education, on site and remote support, providing personnel and management to perform the above tasks. The services may also include developing, installing and maintaining a custom application for a customer.

In accordance with the teachings of the present invention, there is defined a new method of assuring the quality of a services solution.

It is believed that such a method would constitute a significant advancement in the art.

OBJECTS AND SUMMARY OF THE INVENTION

It is therefore a principal object of the present invention to enhance the service solution providing art by providing a quality assurance method for formulating, proposing, and delivering such services in a high quality manner.

It is another object to provide such a method wherein the profit objectives of the providing business are met.

It is yet another object to provide such a method wherein the customer need is satisfied.

These and other objects are attained in accordance with one embodiment of the invention wherein there is provided a method for a services solution, comprising the steps of, defining a first solution by a provider having a business objective, for a customer having a need, performing a first assurance review of the first solution to determine whether the first solution is technically viable, deliverable, and includes technical risk identification, assessment, and containment plans, performing a second assurance review of the first solution to determine whether the first solution includes complete schedules, a complete cost and profit case, and the first solution satisfies both the provider business objectives and the customer need, defining a second solution by the provider, by correcting any deficiencies identified in the first or second assurance reviews, thereafter, performing a first readiness review of the second solution to identify new issues or risks which arose during the obtaining customer commitment step, determine whether delivery plans are established, and establish baselines for performance and the profit case, periodically performing a project management review to verify the second solution is being managed as defined, meeting the profit case, and meeting the customer need, and thereafter, performing a deliverable readiness review to verify that the second solution has been delivered to the customer and that the second solution satisfies the customer need.

BRIEF DESCRIPTION OF THE DRAWING

The FIGURE shows a flowchart of a method of assuring quality in accordance with the present invention.

BEST MODE FOR CARRYING OUT THE INVENTION

For a better understanding of the present invention, together with other and further objects, advantages and capabilities thereof, reference is made to the following disclosure and the appended claims in connection with the above-described drawing.

In the FIGURE there is shown a flowchart describing the steps of a preferred embodiment of the present invention. Although the steps are shown in serial fashion for ease of explanation, there is no sequential limitation implied other than indicated in the appended claims. In addition some steps may be optional.

In step 12 a first solution for a customer need is defined by a provider business having a business objective. The customer need is preferably a need for information technology services by a company as explained above. The first solution defines the services, hardware, and software which will be provided to satisfy the customer need. The business objective includes a profit target but may also include overall revenue, hardware and software sales, personnel utilization, market share, and new business.

In step 14 a first assurance review of the first solution is performed. This review and all subsequent reviews is defined for the purpose of this specification to mean conducting a meeting to inspect, view, examine, or the like, written materials. The meeting may be held in person at a scheduled time and place but may also be held by teleconference, videoconference, or via a computer network or internet connection of the participants. Written materials may include text, graphs, figures, pictures, or video whether in hardcopy printed form or stored in computer readable form or in a format suitable for presentation. This first assurance review determines whether the first solution is technically viable. Technical experts may be called upon to evaluate the first solution in light of the needs of the customer and take positions on the technical feasibility and soundness of the solution. This review also determines deliverability which is taken to mean the ability to deliver the first solution on the planned schedule using the financial and personnel resources identified in the first solution. This review also includes a technical risk identification with appropriate assessment and containment plans. Technical experts may also be used in this part of step 14.

In step 16 a second assurance review of the first solution is performed. This second assurance review has a business emphasis in contrast to the first review just described which has a technical emphasis. During this second assurance review, it is determined whether the first solution includes complete and acceptable schedules and definition of work scope, and a complete and acceptable cost and profit case including contingencies and business risk. Whether the first solution satisfies both the provider business objectives and the customer need is also determined in the second assurance review of step 16.

In step 18 a second solution is defined by the provider. Any deficiencies in the first solution identified in steps 14 and 16 are corrected in this second solution. Correction may involve revisions to the scope or schedules for services as specified in the first solution of step 12.

In step 20, which is optional, a third assurance review is performed. The purpose of this review is to determine whether the second solution defined in step 18 properly corrects the deficiencies identified in steps 14 and 16. Depending on the number or seriousness of these deficiencies this review can be as extensive as the first and second reviews or it can be brief or completely eliminated if for example only minor deficiencies were identified.

In step 22 a commitment is obtained from the customer to the second solution. This commitment may take the form of a signed contract to purchase the services defined in the second solution. It may also be a statement of intent, letter of authorization, or other type of business commitment satisfactory to the provider.

In step 24 a first readiness review of the second solution is performed to identify new issues or risks which were not part of the second solution but which arose thereafter, for example during step 22 of obtaining customer commitment. It is also determined whether delivery plans are established. Delivery plans include plans for project management, schedules, and available resources. Delivery plans may also include plans for communication, organization, tracking, change control, and reporting. Baselines for performance and profit are also established in step 24. A baseline is a measure of the expected level based on the second solution plans.

In step 26 a project management review is performed periodically to verify that the second solution is being managed as defined, that it is meeting the profit case and that it continues to meet the customer need. The frequency of performing this review may vary widely depending on the results of step 24 and any previously performed project management reviews.

In step 28 a deliverable readiness review of the second solution is performed to verify that the second solution has been delivered to the customer and that the second solution satisfies the customer need. This step is normally performed by experts in the subject matter of the second solution and may include inspection of project files and interviews with key supplier and customer personnel.

While there have been shown and described what are at present considered the preferred embodiments of the invention, it will be obvious to those skilled in the art that various changes and modifications may be made therein without departing from the scope of the invention as defined by the appended claims.

What is claimed is:

1. A quality assurance method for an information technology services solution, comprising:
    defining a first information technology services solution by a provider having a business objective for a customer having a need;
    performing a first assurance review of the first solution to determine whether the first solution is technically viable and deliverable, and whether the first solution includes technical risk identification and assessment;
    performing a second assurance review of the first solution to determine whether the first solution satisfies both the business objective of the provider and the need of the customer;
    defining a second information technology services solution by the provider, wherein the second solution comprises: (a) correcting any deficiencies identified in the first assurance review with respect to whether the first solution is technically viable and deliverable, and with respect to whether the first solution includes technical risk identification and assessment; and (b) correcting any deficiencies identified in the second assurance review with respect to whether the first solution satisfies both the business objective of the provider and the need of the customer;
    obtaining a commitment by the customer to the second solution; and
    periodically performing a project management review to verify that the second solution is being managed as defined and is meeting the need of the customer.

2. The method of claim 1, wherein performing the first assurance review or performing the second assurance review comprises electronically performing the first assurance review or electronically performing the second assurance review, respectively.

3. The method of claim 1, wherein performing the first assurance review and performing the second assurance review comprises electronically performing the first assurance review and electronically performing the second assurance review, respectively.

4. The method of claim 1, wherein performing the second assurance review further comprises performing the second assurance review to determine whether the first solution includes complete schedules.

5. The method of claim 1, wherein performing the second assurance review further comprises performing the second assurance review to determine whether the first solution includes complete schedules, and wherein said correcting any deficiencies identified in the second assurance review further comprises correcting any deficiencies identified in the second assurance review with respect to whether the first solution includes the complete schedules.

6. The method of claim 1, further comprising performing a first readiness review of the second solution to identify new issues or risks which arose during obtaining the commitment by the customer.

7. The method of claim 1, wherein if said periodically performing the project management review has verified that the second solution is being managed as defined and is meeting the need of the customer then performing a deliverable readiness review to verify that the second solution has been delivered to the customer.

8. The method of claim 1, further comprising performing a third assurance review of the first solution to determine whether the deficiencies identified in the first and second assurance reviews have been satisfactorily corrected.

9. The method of claim 8, wherein if the third assurance review has determined that the deficiencies identified in the first and second assurance reviews have been satisfactorily corrected then obtaining a commitment by the customer to the second solution.

10. A quality assurance method for an information technology services solution, comprising:
   defining a first information technology services solution by a provider having a business objective for a customer having a need;
   performing a first assurance review of the first solution to determine whether the first solution is technically viable and deliverable, and whether the first solution includes technical risk identification and assessment; and
   performing a second assurance review of the first solution to determine whether the first solution includes a complete cost and profit case and satisfies both the business objective of the provider and the need of the customer;
   defining a second information technology services solution by the provider, wherein the second solution comprises: (a) correcting any deficiencies identified in the first assurance review with respect to whether the first solution is technically viable and deliverable, and with respect to whether the first solution includes technical risk identification and assessment; and (b) correcting any deficiencies identified in the second assurance review with respect to whether the first solution includes the complete cost and profit case and satisfies both the business objective of the provider and the need of the customer;
   obtaining a commitment by the customer to the second solution; and
   periodically performing a project management review to verify that the second solution is being managed as defined, is meeting the profit case, and is meeting the need of the customer.

11. The method of claim 10, wherein performing the first assurance review or performing the second assurance review comprises electronically performing the first assurance review or electronically performing the second assurance review, respectively.

12. The method of claim 10, wherein performing the first assurance review and performing the second assurance review comprises electronically performing the first assurance review and electronically performing the second assurance review, respectively.

13. The method of claim 10, wherein performing the second assurance review further comprises performing the second assurance review to determine whether the first solution includes complete schedules.

14. The method of claim 10, wherein performing the second assurance review further comprises performing the second assurance review to determine whether the first solution includes complete schedules, and wherein said correcting any deficiencies identified in the second assurance review further comprises correcting any deficiencies identified in the second assurance review with respect to whether the first solution includes the complete schedules.

15. The method of claim 10, further comprising performing a first readiness review of the second solution to identify new issues or risks which arose during obtaining the commitment by the customer and to establish baselines for said profit case.

16. The method of claim 15, wherein performing the first readiness review further comprises performing the first readiness review of the second solution to determine whether delivery plans are established.

17. The method of claim 16, wherein if the first readiness review has determined that the delivery plans are established then periodically performing a project management review to verify that the second solution is being managed as defined, is meeting the profit case, and is meeting the need of the customer.

18. The method of claim 10, wherein if said periodically performing the project management has verified that the second solution is being managed as defined, is meeting the profit case, and is meeting the need of the customer then performing a deliverable readiness review to verify that the second solution has been delivered to the customer.

19. The method of claim 10, further comprising performing a third assurance review of the first solution to determine whether the deficiencies identified in the first and second assurance reviews have been satisfactorily corrected.

20. The method of claim 19, wherein if the third assurance review has determined that the deficiencies identified in the first and second assurance reviews have been satisfactorily corrected then obtaining a commitment by the customer to the second solution.

* * * * *